Figure 1:
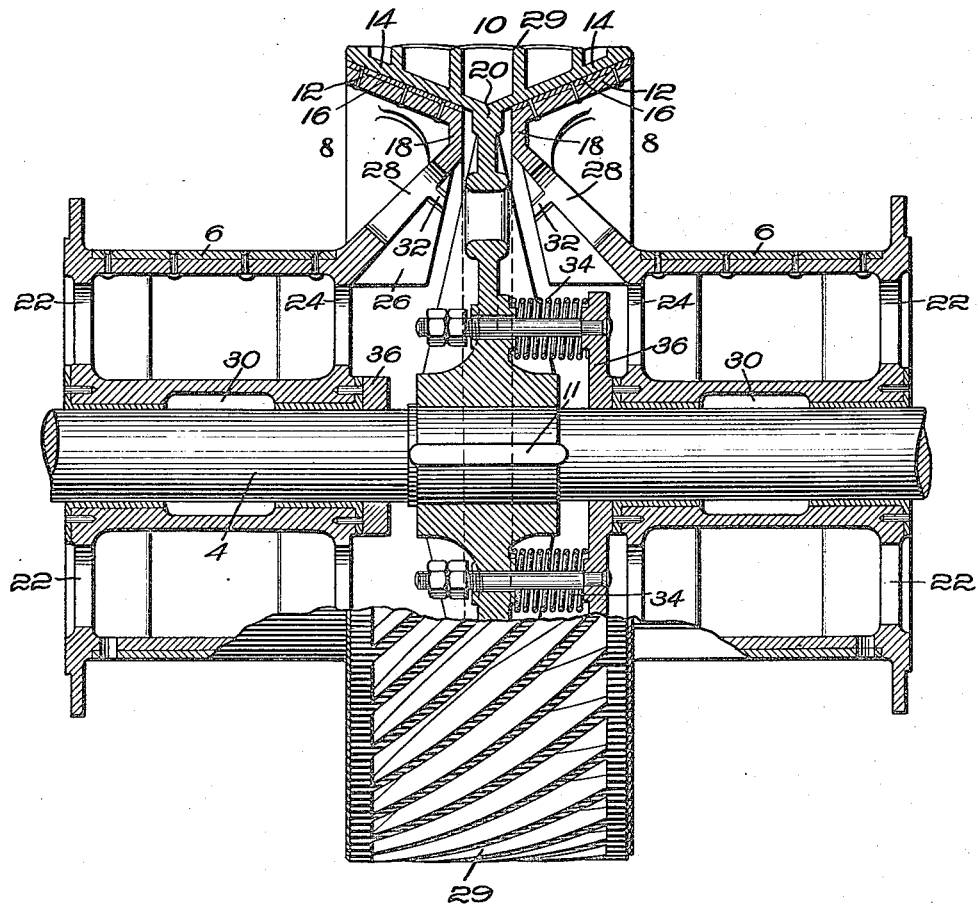

Nov. 11, 1924.

A. E. NORRIS 1,515,401

CLUTCH

Filed April 29 1921  2 Sheets-Sheet 1

Nov. 11, 1924.

A. E. NORRIS 1,515,401

CLUTCH

Filed April 29 1921    2 Sheets-Sheet 2

Patented Nov. 11, 1924.

1,515,401

UNITED STATES PATENT OFFICE.

ALMON E. NORRIS, OF BROOKLINE, MASSACHUSETTS.

CLUTCH.

Application filed April 29, 1921. Serial No. 465,377.

*To all whom it may concern:*

Be it known that I, ALMON E. NORRIS, a citizen of the United States, and a resident of Brookline, in the county of Norfolk and State of Massachusetts, have invented an Improvement in Clutches, of which the following description, in connection with the accompanying drawings, is a specification, like characters on the drawings representing like parts.

This invention relates to clutches, and is more especially concerned with a clutch of the class represented by United States Letters Patent No. 719,033, issued to me January 27th, 1903, adapted for use in connection with hoisting apparatus such as a grab bucket having two ropes wound on drums to which power is applied by two clutches combined in a single unit having an intermediate member common to both clutches, although the invention is by no means restricted to a clutch of this particular type.

The invention will be best understood by reference to the following description, when taken in connection with the accompanying drawings of one specific embodiment thereof, while its scope will be more particularly pointed out in the appended claims.

Figure 2:
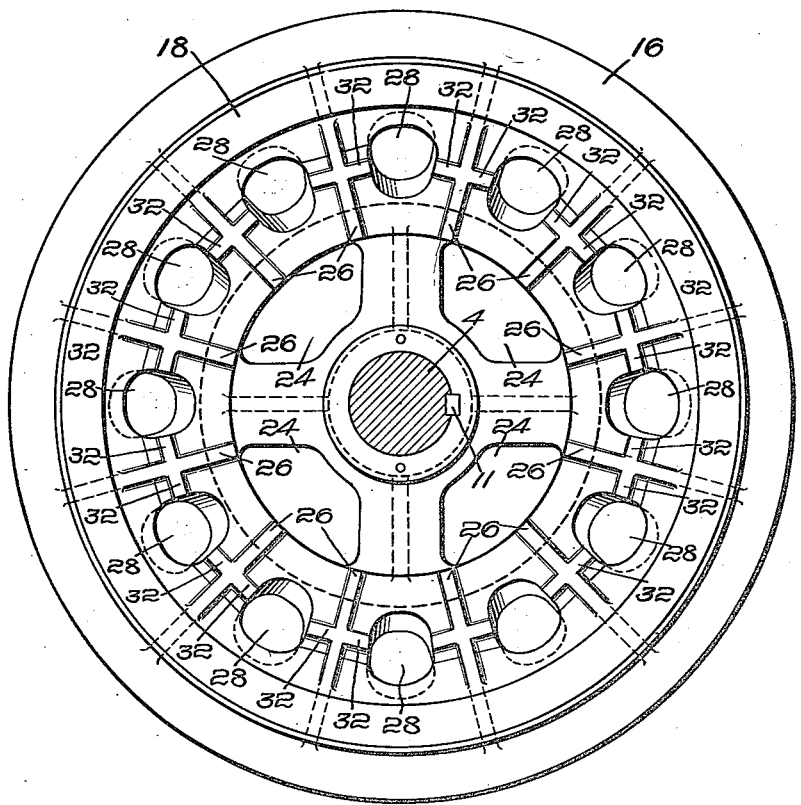

In the drawings:

Fig. 1 is a central, longitudinal section, partly in elevation, of a clutch mechanism exemplifying my invention; and Fig. 2 is an elevation of one of the clutch members as viewed from the inner end thereof.

Referring to the drawings, and to the embodiment of my invention which is selected for exemplification, I have shown a clutch mechanism comprising a shaft 4, on which two rope-winding drums 6 are loosely mounted for independent rotation, and are free to slide lengthwise. Carried by each of these drums is a clutch member 8, each of which cooperates with an intermediate clutch member 10, the latter being suitably secured to and held against rotation on the shaft, as by a key 11.

In the present example, I have shown oppositely-facing cone clutches, each comprising inner and outer cones 12 and 14. The inner cone is provided with any usual or suitable lining or facing 16. An important feature of my invention relates to the means of support for the cones, it being such as to provide for corresponding radial expansion and contraction of both of the engaging surfaces. It has been found in practice that this is an important factor in preventing undue heating of the clutch when slipping action of one member on the other is allowed to take place, as during the lowering of the load. Experience has shown that unequal expansion of the conical surfaces results in an engagement of the surfaces over less than their full area, with the result that rapid heating and wear takes place. This is avoided in the present construction by the novel manner in which the cones are supported, as will now be described.

Each of the cones is supported at its inner end only, and is in the form of a flange. In the case of the cone 12, the flange is supported by a web 18, while the flange 14 is supported by a web 20. Suitable provision for cooling the clutch is made by providing the drums with openings 22, at which air is taken in, it then passing through openings 24 to the space within the clutch, where provision is made to cause it to be expelled by the action of centrifugal force by the use of blades 26 carried by the clutch members 8, which whirl the air around within the clutch. The air is released through openings 28 in proximity to the externally disposed annular surface of the part 12, the air travelling across said surface and cooling the same. The intermediate clutch member is provided with angular ribs 29, which assist in radiating the heat. This mode of cooling is generally similar to that employed in the clutch of the aforesaid patent. In the present invention, however, these openings are utilized for an additional purpose, namely: to assist in disposing of surplus oil which might otherwise find its way to the engaging surfaces of the clutch members, and interfere with their proper action.

Each of the drums is provided with a chamber 30 for a lubricant which may be either oil or grease for lubricating the bearings of the drums on the shaft. Some of this oil is bound to work its way along to the intermediate portion of the shaft, where it is thrown off in the general direction of the engaging surfaces of the clutch members. This surplus oil is caught by shields or guards, herein in the form of flanges 32, which extend in a circumferential direction intermediate the openings 28. These flanges are preferably directed inwardly toward the shaft, and they are so placed with relation to the openings 28 as to cause the oil to be thrown out through the latter, and thus prevented from reaching the clutch surfaces.

The clutch members may be engaged and disengaged by any usual or suitable mechanism, such as that disclosed in the aforesaid patent. In Fig. 1 of the drawings, I have shown merely the means for releasing or disengaging the clutches comprising pairs of springs 34 interposed between the web 20 of the intermediate clutch member, and a yoke 36, having endwise engagement with the inner end of the corresponding drum. The general operation of the clutch should be apparent without further description.

Having thus described one embodiment of my invention, but without limiting myself thereto, what I claim and desire by Letters Patent to secure is:

1. In a clutch, the combination of a pair of cooperating clutch members having webs provided with concentric flanges extending in the same direction from said webs and presenting frictionally engaging surfaces by which the power is transmitted from one to the other, one of said members being provided with an opening for the escape of air from the clutch, means presenting a chamber into which air is taken and delivered through said opening to cool said surfaces, and means carried by one of said webs intermediate said flanges and the clutch axis to catch surplus oil and direct the same outward through said opening.

2. In a clutch, the combination of a pair of cooperating clutch members having frictionally engaging surfaces by which the power is transmitted from one to the other, one of said members being provided with a series of openings about the axis, and a series of ribs intermediate said openings to cause surplus oil to be caught by said ribs and directed to said openings.

3. In a clutch, the combination of a pair of cooperating clutch members having concentric engaging parts, means supporting said parts at corresponding ends and presenting a chamber having outlets directed in proximity to the externally exposed, inner, annular surface of the inner concentric part, and means for causing air to be taken into said chamber and discharged through said outlets past said surface to cool the same.

4. In a clutch, the combination of inner and outer, concentric clutch members having frictionally engaging surfaces by which power is transmitted from one to the other, said inner member having an externally disposed, inner circumferential surface, and means presenting a chamber having an inlet and an outlet directed in proximity to said inner circumferential surface of the inner clutch member, means to utilize centrifugal force to effect the cooling of said surfaces by air conducted through said chamber and through said outlet against said inner circumferential surface.

5. In a clutch, the combination of inner and outer, concentric clutch members having frictionally engaging surfaces by which power is transmitted from one to the other, means presenting a chamber having an inlet and an outlet directed in proximity to the inner circumferential surface of the inner clutch member, means to utilize centrifugal force to effect the cooling of said surfaces by air conducted through said chamber through said outlet and thence onto said inner circumferential surface, and means to cause surplus oil to pass out through said outlet.

In testimony whereof, I have signed my name to this specification.

ALMON E. NORRIS.